US006330490B1

(12) United States Patent
Kim et al.

(10) Patent No.: US 6,330,490 B1
(45) Date of Patent: Dec. 11, 2001

(54) DATA VENDING MACHINE SYSTEM AND METHOD THEREOF

(75) Inventors: Jong Woo Kim; Soon Seop Ryoo, both of Seoul; Jun Mo Yang, Kyoungki-do, all of (KR)

(73) Assignee: Hansol Telecom Co., Ltd., Seoul (KR)

( * ) Notice: Subject to any disclaimer, the term of this patent is extended or adjusted under 35 U.S.C. 154(b) by 0 days.

(21) Appl. No.: 09/486,657

(22) PCT Filed: Jun. 29, 1999

(86) PCT No.: PCT/KR99/00343

§ 371 Date: May 22, 2000

§ 102(e) Date: May 22, 2000

(87) PCT Pub. No.: WO00/00972

PCT Pub. Date: Jan. 6, 2000

(30) Foreign Application Priority Data

Jun. 30, 1998 (KR) .......................................... 98-26094

(51) Int. Cl.[7] .......................................... G06F 17/00

(52) U.S. Cl. .......................... 700/234; 700/235; 700/236; 700/241

(58) Field of Search .......................... 700/231, 234, 700/235, 232, 237, 241, 236, 244; 235/381, 382; 369/29, 30

(56) References Cited

U.S. PATENT DOCUMENTS

| | | | | |
|---|---|---|---|---|
| 3,990,710 | * | 11/1976 | Hughes | 274/1 |
| 4,674,055 | * | 6/1987 | Ogaki et al. | 364/479 |
| 4,703,465 | * | 10/1987 | Parker | 369/30 |
| 4,787,050 | * | 11/1988 | Suzuki | 364/479 |
| 4,937,807 | * | 6/1990 | Weitz et al. | 369/85 |
| 5,206,814 | * | 4/1993 | Cahlander et al. | 364/479 |
| 5,228,015 | * | 7/1993 | Arbiter et al. | 369/33 |
| 5,237,157 | * | 8/1993 | Kaplan | 235/375 |
| 5,418,763 | * | 5/1995 | Ichikawa et al. | 369/30 |
| 5,445,295 | * | 8/1995 | Brown | 221/3 |
| 5,633,839 | * | 5/1997 | Alexander et al. | 369/30 |
| 5,734,719 | * | 3/1998 | Tsevdos et al. | 380/5 |
| 5,794,217 | * | 8/1998 | Allen | 705/27 |
| 5,809,298 | * | 9/1998 | Nakada | 395/615 |
| 5,848,398 | * | 12/1998 | Martin et al. | 705/14 |

FOREIGN PATENT DOCUMENTS

| | | | |
|---|---|---|---|
| 9-171659 | 6/1994 | (JP) | G11B/20/10 |
| 11-120693 | 4/1999 | (JP) | G11B/20/10 |

* cited by examiner

*Primary Examiner*—Christopher P. Ellis
*Assistant Examiner*—Khoi H. Tran
(74) *Attorney, Agent, or Firm*—Gardner, Carton & Douglas

(57) ABSTRACT

The present invention relates to a data vending machine system and a method thereof, and in particular to a data vending machine system and a method thereof which are capable of selecting a certain music file, recording the selected music file onto a recording medium and printing a selected image and character message on a surface of the recording medium. The present invention includes a host computer for storing a digital music file and a plurality of remote data vending machine connected with the host computer. The data vending machine includes at least one listing and reserving apparatus for providing a reservation function of the music files selected by the customer, a database and fabrication control apparatus for storing a part of the music files stored in the host computer and recording the selected music file onto the recording medium, and a charge paying unit. There are further provided a main apparatus which performs the entire control operation of the data vending machine so that the music files selected by the customer is fabricated as one music album, and a network apparatus for thereby effectively managing the database of the remote data vending machine and minimizing the waiting time of the customer.

17 Claims, 5 Drawing Sheets

DATA VENDING MACHINE SYSTEM AND METHOD THEREOF

BACKGROUND OF THE INVENTION

1. Field of the Invention

The present invention relates to a data vending machine system and a method thereof, and in particular to a data vending machine system and a method thereof which are capable of recording a music selected by a user (customer) onto a recording medium, printing a certain photo and character message selected by a user on a surface of a recording medium (CD: Compact Disc or DVD: Digital Video Disc) for thereby manufacturing a demand-on music album.

2. Description of the Background Art

Recently, as a data compression and communication technique is advanced, the use of selecting a computer communication service site or a certain internet site for thereby listening a selected music or downloading the selected music is sharply increased. However, in order to download and use the compressed music file, a certain reproducing apparatus such as a PC (Personal Computer) having a sound card therein or a MPEG player is needed. In addition, as an interest in an intellectual right is increased, the persons having an intellectual property right restrict downloading a compressed data file on a computer communication and reproducing the downloaded compressed data files.

In order to overcome the above-described problems, various methods for converting a data file, which is compressed in such a manner that a compressed music file is reproduced using a CD reproducing apparatus or a cassette tape reproducing apparatus, onto a wave format file or and an analog format file and recording onto a recording medium for selling the same are disclosed.

Various techniques for remotely selling a certain music compressed even in a digital format file or other formats are disclosed. These techniques have the following elements. Namely, a conventional system includes a database for storing a digital data, an input unit such as a keyboard or a touch screen for selecting a certain data as a data selection unit, an output unit such as a monitor for displaying various guide messages and a data selected by a user, a charge processing unit in order for a user, who received a music service, to pay for the service, a recorder such as a CD recorder so that a user records a selected data onto a recording medium, and a control apparatus for controlling the above-described units and implementing a demand-on recording medium.

The above-described conventional data vending machine system is classified into three types. In the first type, the data stored in the storing apparatus of a remote data vending machine are sold. In the second type, the remote data vending machine is connected with a host computer via a high speed communication link for thereby downloading the information stored in the host computer. In the third type, the music files stored in the storing apparatus of the remote data vending machine as well as the music files stored in the host computer are sold for thereby selling various data without using a high speed communication link. Namely, the storing apparatus is provided in the remote data vending machine, and the remote data vending machine is connected with the host computer including a large capacity database through the communication link.

As a representative example of the third type, there is the Japanese Patent Laid-Open Publication No. Hei 5-307866 (Nov. 19, 1993). In the above-described reference, a plurality of remote data vending machines which are connected with a host computer through a communication line are provided. Namely, in the reference, in order to overcome the problem that the music files stored in the storing unit of the data vending machine, not connecting to the host computer, and a plurality of remote data vending machines are connected with a host computer via the communication network. If a music file selected by a user does not exist in the data vending machine, a transmission of a music file is requested by a user and then is stored in the storing unit of the data vending machine and is recorded onto a recording medium of the user for thereby selling a music requested by the user. In addition, the remote data vending machine may include a charge paying unit for paying the service of the music selected by the user.

As another example of the remote data vending machine connected with a host computer through a high speed communication link, the Korean Patent No. 143358 granted to the IBM discloses "Digital data access, transfer and music album manufacturing system".

In the above-described conventional data vending machine systems, a demand-on music file is sold by the following processes. Namely, in the conventional data vending machine, when a customer pays for a cost corresponding to the selected data filed, the customer receives a selected data file from the host computer and records the same onto a recording medium, and then pays for a cost corresponding to the recorded data files, so that the conventional data vending machine receives a data file, which is not stored in the storing unit of the vending machine, from the host computer and then records the received data file onto a recording medium.

Therefore, in the above-described conventional vending machine system, in a state that a customer starts buying the music files, the data file is downloaded from the host computer. When the downloading operation is completed, a recording operation is performed, so that it takes a long time to download and record the selected music files.

In addition, in the conventional remote data vending machine, different data format files are stored in accordance with a user's request. If the data files stored in the remote vending machine are lost, it is needed to recover the remote data vending machine using the data files which are stored before the data are lost. However, in the conventional data vending machine system, it is impossible to recover the lost data files. Namely, if the data of the remote data vending machine are lost, it is impossible to effectively overcome the lost data.

SUMMARY OF THE INVENTION

Accordingly, it is an object of the present invention to provide a data vending machine system and a method thereof which are capable of minimizing time required for buying a compressed data file such as a music file.

It is another object of the present invention to provide a data vending machine system and a method thereof which are capable of effectively managing a storing unit installed in a remote data vending machine and recovering a lost data file.

It is another object of the present invention to provide a data vending machine system and a method thereof which are capable of manufacturing a demand-on music album by printing a certain photo, character, and message on a recording medium.

To achieve the above objects, there is provided a data vending machine which includes a first database for storing a plurality of digitalized data files, a management database for storing a management data including a list of data files stored therein by each data vending machine, a sold date of each data file, and a sold number of the same, a management data updating unit for updating the management database in accordance with a management data transferred from the data vending machine, a deletion instruction message generation unit for generating a message for instructing a deletion data file which will be deleted among the data files stored in the data vending machine with reference to the management data corresponding to the management database when a data file transfer request is received from the data vending machine, and a transferring unit for transferring a data file requested from the data vending machine to the data vending machine together with a deletion message generated by the deletion instruction message generation unit, each data vending machine, comprising a second database for storing a part of the data files stored in the first database of the host computer, a listing and reserving apparatus for providing a listing and selection function and a procurement reservation function of the lists of the data files stored in the first database stored in the host computer, a fabrication unit for reading a data file selected by a customer from the second database of the data vending machine and recording the read data file onto a recording medium, a charge processing unit for processing the charge for the cost of the data file, and a main control apparatus for controlling the entire operations of the system, said main control apparatus, comprising a reservation information processing unit for requesting a transfer of the data files which are not stored in the second database among the data files reserved by the listing and reserving apparatus to the host computer, a database managing unit for deleting the deletion instructed data file from the second database when a deletion request data file is received from the transfer unit of the host computer together with the deletion instruction message and storing the received data file onto the second database, a procurement processing unit for reading a data file selected by the customer from the second database and recording the read data file onto a recording medium by instructing to a fabrication unit, and a selling information transfer unit for storing a selling information related to the procurement data file of the customer and transferring to the host computer in the data vending machine which includes a host computer and a plurality of remote data vending machine connected with the host computer via a communication network.

In the data vending machine system according to the present invention, it is possible to efficiently use a certain storing capacity of each remote vending machine storing unit by managing a database of each remote vending machine at a central host computer and performing a back-up operation using the central host computer for thereby recovering the data vending machine using the data stored before an error occurs. In addition, in the present invention, it is possible to decrease time required when a user waits for buying a music file by downloading and storing a data file which is not stored in a second database of the data vending machine among the data files selected by a customer from the host computer before the customer pays for the music file.

The data vending machine includes a photo picturing apparatus for picturing a photo of a customer in accordance with a control of the main control apparatus, an input unit for inputting a character message in accordance with a control of the main control apparatus, and a printing apparatus for printing a photo (or an image selected among the stored images) of a customer pictured by the picturing apparatus in accordance with a control of the main control apparatus and a character message inputted by the customer on a surface of the recording medium.

To achieve the above objects, there is provided a data vending method which includes a first step for selecting a list of data files among the lists of a plurality of data files stored in the host computer and reserving the selected data files, a second step for receiving the data files which are not stored in the data vending machine among the reserved data files from the host computer and updating a database of the data vending machine using the received data files, a third step for checking whether a reservation is made when a procurement is requested by a customer, a fourth step for displaying the data files included in a reservation information having a reservation number identical to the stored reservation information on a screen and checking whether a charge payment is made when a reservation is made, a fifth step for instructing the reserved data files to be recorded onto a recording medium when the charge payment is made and storing a sold information of the data files which will be recorded, a sixth step for checking whether the charge payment is made in the case that a customer directly selects and buys a certain music file without making a reservation in the third step, a seventh step for displaying the list of the data files stored in the database of the vending machine when the charge payment is made, an eighth step for instructing the selected data files to be recorded onto a recordable recording medium when a certain data file is selected among the list of the displayed data files and storing an information of the selected and sold data files, and a ninth step for reading the record-instructed data files from the database and recording onto a selected recording medium wherein the a data vending method adapted to a system includes a host computer for storing a plurality of data files and a plurality of remote vending machines connected with the host computer via a communication network.

In the method of the data vending machine according to the present invention, it is possible to decreasing time required for buying a music file by downloading and storing a data file selected by a customer onto a remote data vending machine before a customer pays for a music file and selecting only a data file stored in the data vending machine for buying a data music file in the case that a customer does not make a reservation for buying the data music file.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
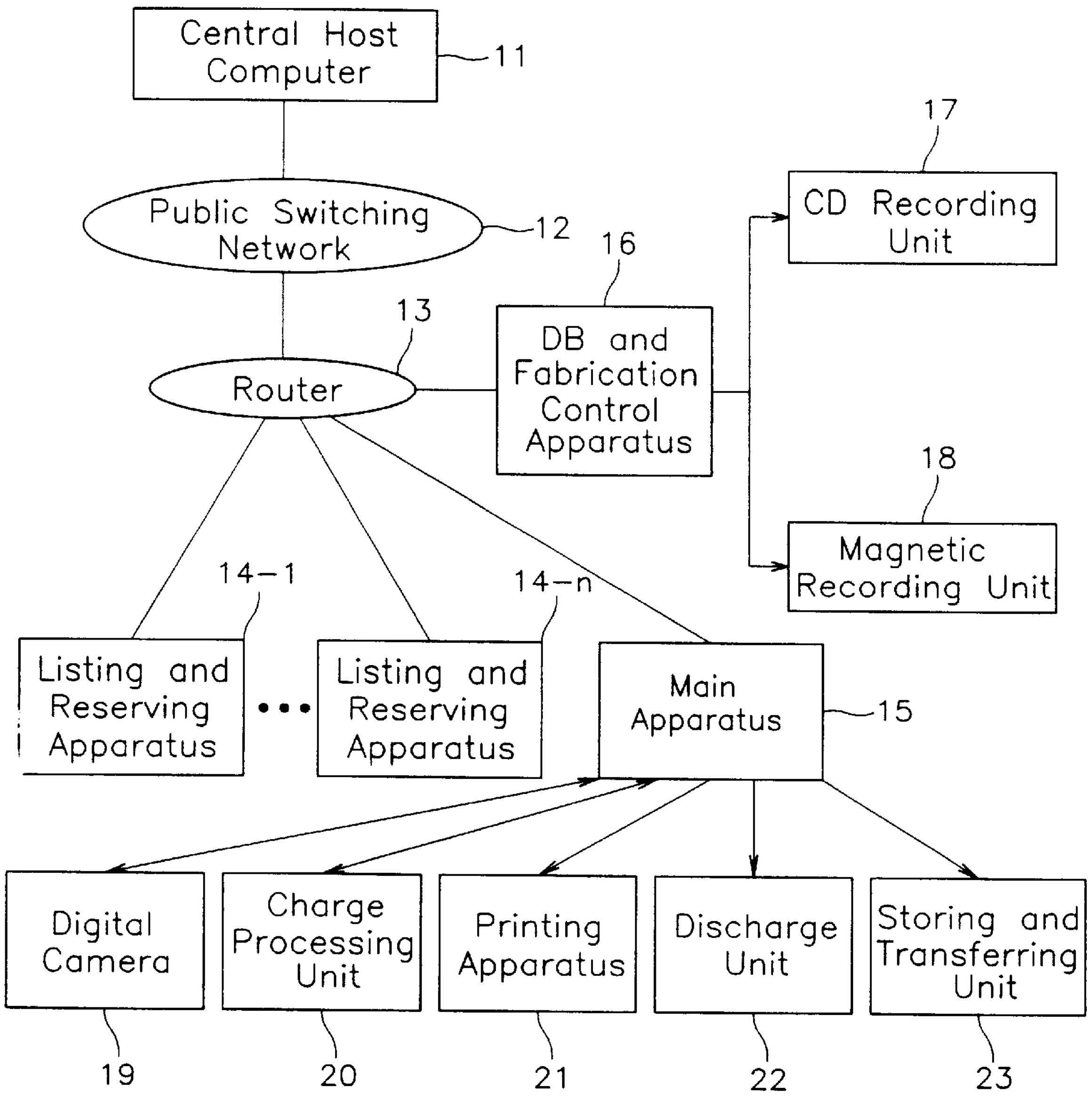
FIG. 1 is a block diagram illustrating a data vending machine system according to the present invention.

FIG. 1 is a block diagram illustrating a data vending machine system according to the present invention. As shown therein, reference numeral 11 represents a central host computer, 12 represents a public switching network, 13 represents a router, 14-1 through 14-n represent listing and reserving apparatuses, 15 represents a main apparatus, 16 represents a database DB and fabrication control apparatus, 17 represents a CD recorder, 18 represents a magnetic recorder, 19 represents a digital camera, 20 represents a charge processing unit, 21 represents a printing apparatus, 22 represents a recording medium discharging unit, and 23 represents an empty recording medium storing and transferring unit.

The central host computer 11 includes a large capacity database for storing a plurality of music files which are available in the data vending machine, an accounting and data gathering apparatus for paying an intellectual right service charge based on a music selection by a user and gathering a certain data used for a market search, and a network management unit for managing each remote data vending machine and controlling a system operation and network management. Here, the data is compressed and stored in the database of the central host computer 11 for implementing an efficient use of a storing capacity of the database and a fast data transfer. In addition, the central host computer 11 includes a function for checking a sold quantity of the music files and a charge corresponding to the sold music file, so that a record manufacturing company and a license holder can easily check the sold quantity of the music files and others. The record company or license holder accesses the central host computer through a terminal for thereby checking the sold quantity of the music files. In addition, various functions may be provided in the central host computer. The description of the known functions will be omitted.

In order to effectively manage the remote data vending machine, the central host computer 11 includes a list of the music files stored therein, a data at the time when a certain music file is sold, and a sold quantity of the music files.

Therefore, it is possible to effectively manage the storing unit of the remote data vending machine having a limited storing capacity. Even when the data are lost due to a certain error at the storing unit of the data vending machine, it is possible to effectively recover the lost data. Namely, in the case that the data stored in the remote data vending machine are lost, only a music file corresponding a list of the music files corresponding to the error data vending machine managed by the central host computer 11 is transferred from the central host computer 11 to a corresponding remote data vending machine, so that the lost data are recovered using the data stored before an error occurs at the storing unit of the data vending machine. In addition, in the central host computer 11, it is possible to check an inventory such as a printing paper, an empty CD, an empty magnetic tape, etc. which are a consumption article of the remote data vending machine. In addition, the state of the system may be periodically or non-periodically checked by transmitting a test signal to a corresponding data vending machine. When checking an inventory and housing a consumption article by an operator of each remote data vending machine, the amount of the consumption article is inputted, and the consumption of the article is checked by the remote vending machine whenever each consumption article is consumed. The data corresponding to the thusly checked consumption articles are periodically transmitted to the central host computer, so that it is possible to check an inventory of the consumption article.

In addition, the major features of the present invention for achieving the above-described functions of the central host computer will be explained in detail.

The central host computer includes a managing database for storing a management data including a list of the data files stored therein by each data vending machine, a sold date, and a sold number of each music file, a management data update unit for updating a management database in accordance with a management data transmitted from the remote data vending machine, a deletion instruction message generating unit for generating a message which instructs a data file deletion in the data files stored in the data vending machine with reference to the management data corresponding to the management database, and a transfer unit for listing a data file requested at the data vending machine together with the message generated by the deletion instruction message generation unit from a large capacity database and transferring to the data vending machine.

Here, the management database may be provided in one system together with the large capacity database or may be independently provided. In addition, the management data update unit and the deletion instruction message generation unit and transfer unit may be implemented using a software. The operation of the central host computer will be provided when describing the operation of the entire system.

The public switching network 12 may be a known telephone switching network. In addition, the communication network may be a certain communication network such as a cable TV communication network.

The remote data vending machine according to the present invention includes a router 13, listing and reserving apparatuses 14-1 through 14-n, a main apparatus 15, a database and fabrication control apparatus 16, a CD recorder 17, a magnetic recorder 18, a digital camera 19, a charge processing unit 20, a printing apparatus 21, a recording medium discharging unit 22, and an empty recording medium storing and transfer unit 23.

The router 13 connects the listing and reserving apparatuses 14-1 through 14-n and the main apparatus 15 and connects the database and fabrication control apparatus 16 with a LAN (Local Area Network) and the central host computer 11 through the public switching network 12.

The listing and reserving apparatuses 14-1 through 14-n, the main apparatus 15, and the database and fabrication control apparatus 16 are an apparatus such as a personal computer. The listing and reserving apparatuses 14-1 thorough 14-n and the main apparatus 15 are not shown in the drawings but include a monitor for displaying, a keyboard for inputting data, and a touch screen. The listing and reserving apparatuses 14-1 through 14-n each provide a function for listing the music when a customer buys a music file and reserving a certain music for buying the same. Namely, the listing and reserving apparatuses display the entire music titles stored in the database of the central host computer. At this time, various menu are displayed on the listing and reserving apparatuses for listing the music by singer, genre, chart sequence, alphabetic sequence, music file series, etc.

Namely, when a customer makes a reservation using the listing and reserving apparatus, the listing and reserving apparatuses display various menu in the above-described manner.

On the menu, the music file series represents a packaged music album, and the genre represents a pop song, country song, etc. When a certain item is selected on the menu by a customer, the listing and reserving apparatus 14-1 reads the entire music lists corresponding to the selected menu from a hard disk of the main apparatus 15 and displays the selected lists on the screen.

When the entire music lists corresponding to the selected menu are displayed, the customer touches a certain item of the displayed lists using a direction key or inputs a certain code of the displayed music files using a keyboard for thereby selecting a certain music. Here, a printed paper which is used so that the customer inputs a certain code allocated to each music file for reserving the music may be provided near the remote data vending machine. Namely, the customer may select a certain music with reference to the lists on the screen and may reserve a certain music by previously recognizing a certain code of the music and inputting a code using the keyboard in the reserving apparatus. The lists of the music selected by the customer are displayed on a certain portion of the monitor of the listing and reserving apparatus separately from the entire lists. When the selection of the music is completed by the above-described method, the listing and reserving apparatus outputs a reserved number, and the customer is guided to input a password corresponding to the reservation. The reservation information is reported to the main apparatus 15 by the above-described method.

In addition, when a customer selects a certain music, the thusly selected music is reproduced for a certain time through an audio reproducing and output unit (not shown) of the listing and reserving apparatus. The main apparatus 15 includes a list of the entire music files based on the menu, and the sample data of the entire music files, so that a sample data of the music selected by the customer using the main apparatus 15 or the listing and reserving apparatus 14-1 through the audio reproducing and output unit. Therefore, it is possible to previously check the selected music before buying it.

A part of the music files stored in the large capacity database of the central host computer is stored in the database DB and the fabrication control apparatus 16, and the music files selected by the customer are recorded onto a recording medium.

In other words, a limited number of the music files is stored in the database 16 of the data vending machine. In addition, the database 16 is managed by a control of the main apparatus 15. Namely, in the case that the music file reserved by the customer is not stored in the database 16, the main apparatus 15 requests a download of the reserved music file to the central host computer 11. In addition, when the main apparatus 15 receives a music deletion file information and the requested music file from the central host computer, the music file instructed by the central host computer 11 is deleted from the database 16, and the requested music file is stored in the database 16.

The fabrication control apparatus 16 includes a reading unit for reading a data file indicated by the main apparatus from the remote database, a decoding processing unit, a recording process unit, and a memory for a buffering function.

The decoding process unit decodes and buffers a certain music file read from the database in accordance with an instruction of the main apparatus 15, and the recording process unit controls the recorder so that the music file decoded by the decoding process unit is converted onto a certain signal format proper for the selected recording medium. Therefore, since the fabrication control apparatus 16 performs the decoding operation and the recording operation, it is possible to decrease time required for buying a certain music file. Preferably, since the music file are stored in the database 16 of the data vending machine is a compressed form, a process for decompressing the compressed file is needed.

The recorder includes a CD recording unit 17 for recording a certain music onto a CD, and a magnetic recording unit 18 for recording the music onto a magnetic tape such as an audio tape.

Various recording units which are proper to other recording medium may be provided.

The main apparatus 15 receives a customer's music file reservation and performs a communication with the central host computer 11 and performs an entire control operation for manufacturing a certain music file requested by the customer.

Namely, the lists of the entire music files by the menu and the sample data of the entire music files are stored in the hard disk of the main apparatus 15. In addition, the main apparatus manages the lists of the music files stored in the database 16 among the lists of the entire music files. In addition, the main apparatus 15 processes the contents reserved by the listing and reserving apparatus 14-1, manages the database 16, and transfers a recording start instruction to the fabrication control apparatus 16 for thereby fabricating the music files, the main apparatus 15 reports the lists of the music sold to the customer and the sold date to the central host computer 11 whenever the music files are sold. The inventory of the music files remaining in the current data vending machine is periodically checked and reported to the central host computer 11. The main apparatus 15 checks the operation states of each device of the remote data vending machine by an instruction of the central host computer 11, and a result of the check is reported to the central host computer 11.

In another embodiment of the present invention, the main apparatus may report to the central host computer after storing the most recently sold date of each music file and the selling number of the music files without reporting to the same whenever the music files are sold. In the above-described construction, it is possible to decrease the load of the access from the data vending machine to the central host computer but the size of the reverse direction data transmission is increased, so that the management data of the central host computer and the management data of the data vending machine are not coincided.

The operation of the main apparatus 15 will be explained in detail. If there is not the reserved data by checking using the listing and reserving apparatus, the main apparatus 15 checks whether the music files requested by the customer are stored in the database 16. As a result of the check, if there is at least one music file which is not stored in the database 16, the main apparatus 15 requests a music file transfer which is not stored in the database 16, to the central host computer 11. In addition, when the main apparatus 15 receives the requested music files and a message for instructing a deletion of the music file which will be deleted, from the central host computer 11, the main apparatus 15 deletes the instructed music file from the database 16 and stores a newly received music file onto the database 16. The main apparatus 15 deletes the thusly processed reserving information. The main apparatus automatically deletes the reserving information which has a certain elapsed time among the stored reserving information.

When a customer starts downloading the music file from the main apparatus 15, the main apparatus 15 stores the list, sold date and sold number of the sold music files and transfers a recording start instruction to the fabrication control apparatus 16 so that the requested music is recorded onto a recording medium at a short time. The main apparatus 15 does not update the sold date and sold number in the case that the customer made only a reservation, but updates the sold date and sold number in the case that the customer bought a music file after paying for the price of the music file.

In order to perform the above-described operations, the main apparatus includes a central processing unit (CPU). The CPU performs the function based on a loaded program. Namely, the main control apparatus of the main apparatus includes a reserved information process function for requesting a transfer of the data files to the central host computer which are not stored in the database among the data files reserved by the listing and reserving apparatus, a database managing function for deleting the instructed data file from the database when the data file requested together with the deletion instruction message is received from the host computer and storing the received data file into the database, a procurement process function for reading a data file selected by a customer to the fabrication control apparatus 16 from the database and instructing a recording operation onto the recording medium, a sold information transfer function for storing the sold information related to the procurement data files of the customer and transferring the same to the host computer 11, and a function for checking an inventory of the consumption article and transferring the inventory information to the host computer 11. The above-described functions of the main control apparatus may be implemented by a software.

A digital camera 19, a charge processing unit 20, a printing apparatus 21, a recording medium discharge unit 22, an empty recording medium storing and transferring unit 23, an audio reproducing and output unit (not shown), and etc. are connected with the main apparatus 15. In addition, The main apparatus 15 controls the above-described elements so that the customer can buy a certain music file.

The digital camera 19 is used for taking a picture of a customer. The main apparatus 15 controls the system so that the digital camera 19 takes a picture of the customer while the music files selected by the fabrication control apparatus 16 are being recorded onto a recording medium. In addition, the main apparatus 15 controls the system so that the customer directly writes a certain character message on the touch screen or types a certain character message using a keyboard, and the like. The above-described photo and character message input are performed while the requested music files are being recorded, and an image file of the photos and the inputted character message are printed on the surface of the recording medium by a control of the main apparatus 15. Therefore, the thusly manufactured recording medium is produced as a demand-on music album. Various image files may be stored in the system, so that a customer selects a certain image for printing the same onto the recording medium.

The printing apparatus 21 is used for printing a certain image selected from the photos pictured using the digital camera 19, the images stored in the system, or a character message inputted by the customer on the surface of the recording medium.

The charge processing unit 20 is provided for paying for the cost of the music file. The charge processing unit 20 may include one of a cash recognizing and small change unit and a magnetic credit card checking unit and may include both of the same. A receipt printer and discharge unit may be further included.

The recording medium discharge unit 22 is used for discharging the fabricated recording medium to the outside of the system.

The remote recording medium storing and transfer unit 23 stores a recordable empty CD or an empty magnetic tape. In addition, when a music file request is received, the empty recording medium storing and transfer unit 23 transfers a recordable empty CD or an empty magnetic tape to the CD recording unit 17 or the magnetic recording unit 18. When the recording operation is finished, the empty CD or empty magnetic tape is transferred from the recording unit 17 or 18 to the printing apparatus 21. The audio reproducing and output unit (not shown) outputs a guide broadcast and is used in order for the customer to listen the sample data selected by the customer.

The network management and database management between the host computer and the remote data vending machine which are not described in the above are implemented by the known methods.

The operation of the data vending machine system according to the present invention will be explained with reference to the accompanying drawings.

Figure 2:
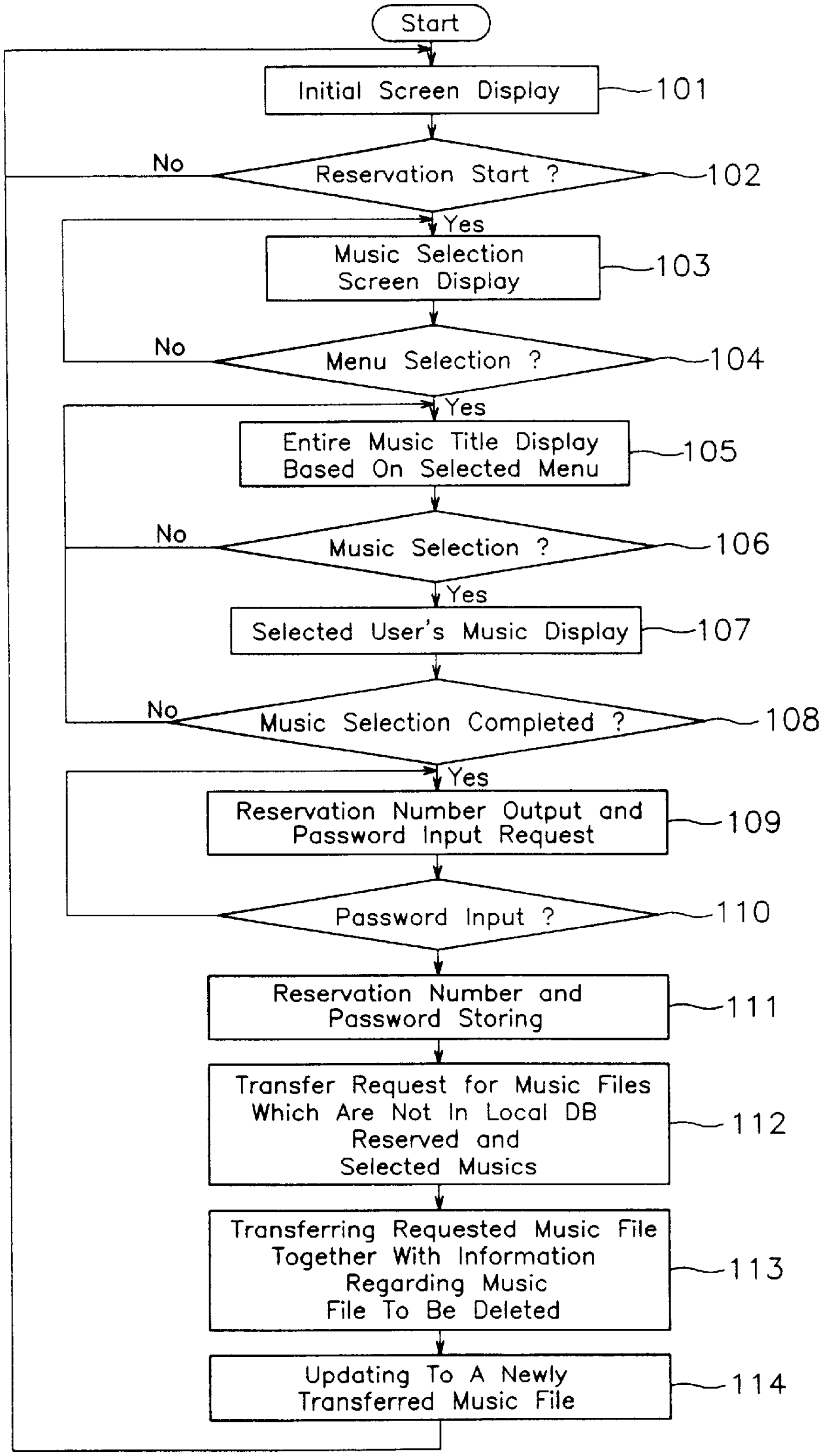
FIG. 2 is a flow chart of a data vending machine according to the present invention.

FIG. 2 is a flow chart of a reservation process, an operation of a listing and reserving apparatus, and an operation of the main apparatus according to the present invention.

In the present invention, in order to rapidly record a music file requested by a customer onto a recording medium, there is provided a reserving function. At the time when the customer buys a certain music file using the main apparatus 15, the music file has been already stored in the database 16 of the data vending machine. Namely, the music files which are not stored in the database 16 are previously downloaded from the central host computer 11 by the main apparatus 15 before the customer buys the music files using the main apparatus 15. When the charge is paid for the cost of the music file using the main apparatus 15, and the fabrication control apparatus 16 reads an instructed music file from the database and records the read music file onto a recording medium in accordance with an instruction of the main apparatus 15. In addition, while the fabrication control apparatus 16 is performing a recording operation, a photo of a customer is pictured for printing the photo of the customer on a surface of the recording medium in accordance with a control of the main apparatus 15 (or a certain image among the related stored images is selected), and a character message is inputted through a touch screen or a keyboard. In addition, upon finishing the recording operation by the fabrication control apparatus 16, a photo (or image) and a character message is printed on a surface of the recording medium in accordance with a control of the main apparatus 15. Therefore, the customer does not feel that it takes a long time because the customer has just finished the photo picturing operation and character input operation. At this time, much recording operation had been already proceeded, the customer actually feels it takes only time lag required for printing the photo and character message.

As shown in FIG. 2, in a state that the listing and reserving apparatus displays an initial screen in Step 101, when a customer makes a reservation in Step 102, the menu screen is displayed in Step 103. When the customer selects a certain menu on the menu screen, a part of the lists of the entire music files corresponding to the selected menu is displayed. A window for the next step is displayed on the screen, so that it is possible to selectively select a list of the entire music files.

When the list of the music files is displayed on the monitor, it is possible to select a certain music by touching a portion of the screen, inputting a code corresponding to each music file, or double-clicking a certain music file using a mouse. When the customer selects a certain music in Step 106, the list of the selected music is displayed on a certain portion of the screen, and the sample data corresponding to the selected music is played. Here, in the case that the customer selects the next music, the reproducing operation of the sample data is finished.

When the customer finishes selecting a certain music file by the above-described method in Step 108, a reservation number is outputted, and a message that a password input is required is displayed in Step 109. In the present invention, the case that the reservation number is provided in sequence by a certain apparatus is adapted. In another embodiment of the present invention, the reservation number may be randomly inputted. However, it is preferred that the reservation number is sequentially provided.

When a customer inputs a password using a keyboard in Step 110, a reservation number and a password corresponding thereto are stored. A reservation information including a list of the reserved music files, the reservation number and the password is transferred to the main apparatus in Step 111. When the reservation is completed by the above-described method, the listing and reserving apparatus is returned to the initial state.

The main apparatus 15 periodically checks whether a reservation information transferred from the listing and reserving apparatus is stored. When one reservation information is stored, the main apparatus 15 checks whether there is a music file which is not stored in the database among the music files included in the reservation information. As a result of the check, if there is a music file which is stored in the database, the main apparatus 15 requests a download of the music file which is not stored in the database, to the central host computer in Step 112.

The central host computer 11 includes a list of the music files stored in the database of each remote data vending machine and a management database including the sold date and sold number of the music files. When a download is performed from the remote data vending machine, or a report is received from the remote data vending machine, the management database is updated. Namely, a download request of the music file is received from the main apparatus 15 of the remote data vending machine, the central host computer 11 generates a message for instructing a deletion of the music file which has small sold number among the music files stored in the database of the remote data vending machine with reference to the management data corresponding to the remote data vending machine which requests a download of the music file from the management database and transfers a newly requested music file to the main apparatus together with the thusly generated deletion instruction message in Step 113. In addition, when a response corresponding thereto is received from the main apparatus 15, the central host computer 11 updates a management data corresponding to the remote data vending machine. Here, the central host computer 11 selects a plurality of deletion possible music files which have the small sold number, and a music file which has the smallest sold number is selected as a file to be deleted.

When a requested music file is received together with a deletion instruction message from the central host computer 11, the main apparatus 15 deletes the instructed music file from the database 16 and stores the requested music file onto the database 16 and updates the lists of the music files stored in the database 16 in Step 114. Here, the updating operation of the lists of the music files stored in the remote database 16 is performed by forming a flag field in the table which stores the lists of the entire music files or by setting the flat or un-setting the same. In addition, in a state that a data selection or data input is requested by the customer in the above-described operation, even when no input is performed during a certain time period, the proceeding state is initialized, and the routine is returned to the initial state.

Figure 3A:
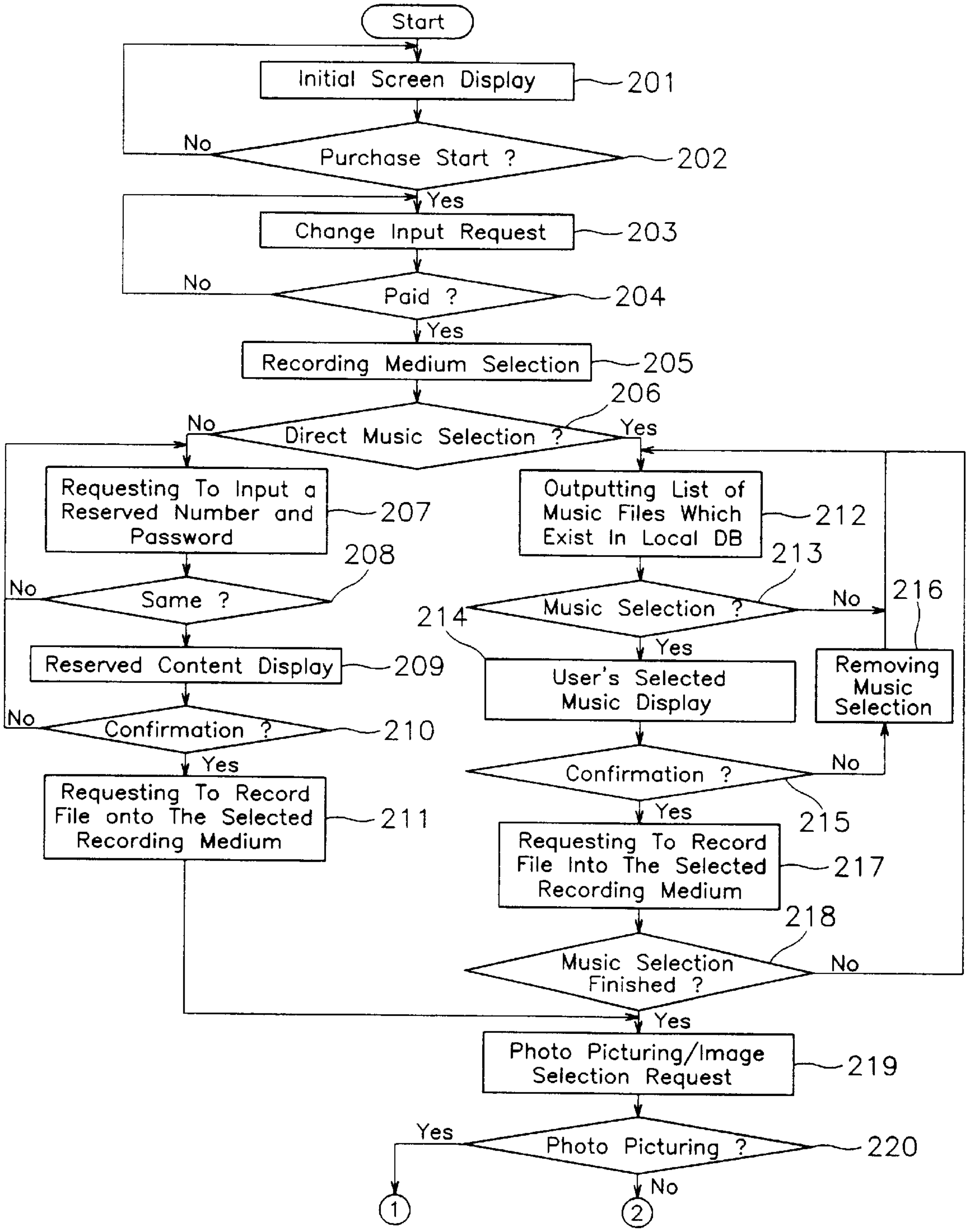
FIGS. 3A and 3B are flow chart illustrating a main apparatus according to the present invention.
Figure 3B:
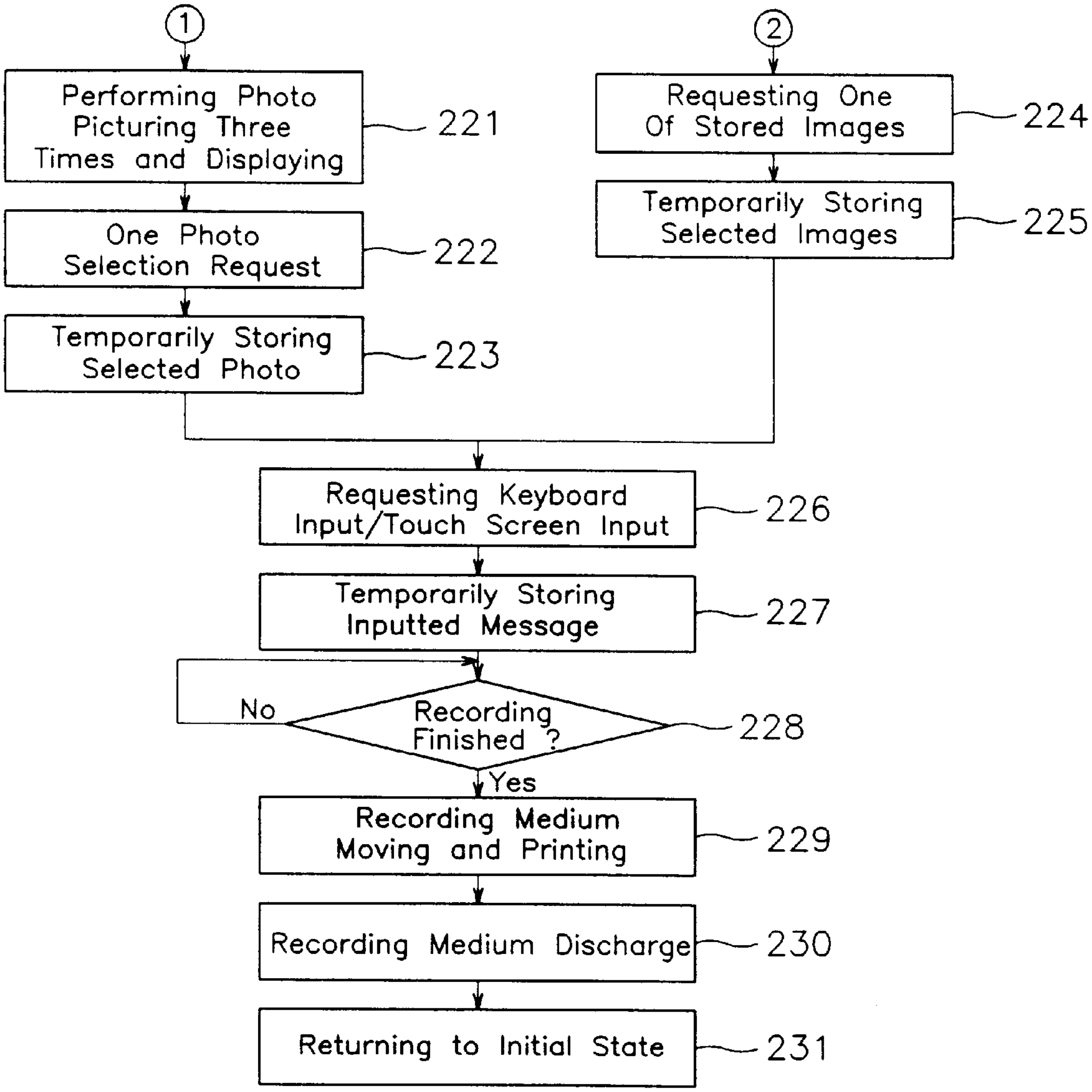

The operation that a customer buys a music file using the main apparatus will be explained with reference to FIGS. 3A and 3B.

In an initial state in Step 201, when a customer starts buying a certain music file in Step 202, the customer is requested to pay for the music file in Step 203. When the payment is performed in Step 204, the type of the recording medium is selected by the customer in Step 205. When the customer selects a certain recording medium, it is checked whether a reservation is made or a corresponding music file is directly selected by the customer in Step 206. The above-described sequence is not important to implement the objects of the present invention. Namely, the sequence may be changed. For example, in a state that the customer starts buying a certain music file, it is checked whether the customer made a reservation or directly selects the music file. After the above-described operation, the charge may be paid. In addition, when the customer selects a certain recording medium, the main apparatus controls the transfer unit 23 for moving the selected recording medium to the recording unit.

In Step 206, when the customer's reservation is confirmed, the customer is requested to input a reservation number and password. When the reservation number and password are inputted, it is checked whether the inputted reservation number exists in the stored reservation number, and the password corresponds to the stored password in Step 208. If not coincided, a re-input is requested. If coincided, the reserved contents are displayed in Step 209. When a confirmation key corresponding to the reserved contents is inputted from the customer in Step 210, the main apparatus 15 transfers a recording start instruction to the fabrication control apparatus 16 so that the selected music files are recorded onto the selected recording medium and stores the list of the sold music files, the sold date, and the sold number and transfers to the central host computer 11.

In a state that the customer does not make a reservation, the customer directly selects a certain music file in Step 206, the main apparatus 15 displays only the lists of the music files stored in the remote database 16 in Step 212. When a certain music is selected by the customer in the lot of the music files displayed on the screen in Step 213, the title of the music selected by the customer is displayed in another region, and at the same time, the sample data is reproduced in Step 214. In this state, if the customer selects a cancellation in Step 215, the selected music is cancelled in Step 216, and the routine is returned to Step 212 in which the list of the music files stored in the local database is displayed.

In Step 215, when the customer selects a confirmation, the confirmation key is inputted, and at the same time, the main apparatus 15 transfers a recording start instruction to the fabrication control apparatus 16 so that the selected music file is recorded onto the selected recording medium and stores the list of the sold music files, the sold date, and the sold number in Step 217. Continuously, when the customer selects another music, the steps 213 trough 217 are performed again. When the customer finishes selecting the music files, the customer is requested to select one of the images such as a stored character, a photo of singer, etc. in Step 219.

If the customer wishes to print his photo in Step 220, the main apparatus 15 guides the customer to prepare a picturing operation. The counts are counted down to display the moment of the picturing operation. The photo picturing operation is repeatedly performed for a certain time by controlling the digital camera. In the present invention, preferably, the photo picturing operation is performed three times, so that the customer can select the best photo. The main apparatus 15 displays the photo obtained by the digital camera on the screen in Step 221, and the customer is requested to select one among a plurality of photos in Step 222. When a certain photo is selected, the selected photo is temporarily stored in Step 223.

If the customer wishes to select one of the stored images, the selection menu is displayed so that the customer selects. When one image among the stored images is selected on the menu screen in Step 224, the selected image file is temporarily stored in Step 225.

Next, in order to receive the character message, it is confirmed whether the character message is inputted on the touch screen or inputted using the keyboard by the customer in Step 226. In the case that the customer inputs a character message using the touch screen, the character message inputted using the touch screen is temporarily stored. In the case that the customer inputs a character message using the keyboard, the character message inputted using the keyboard is temporarily stored in Step 227.

In addition, when a recording completion message that the selected music file has been recorded onto the recording medium is received in Step 228, the main apparatus 15 moves the fabricated recording medium from the recording unit to the printing apparatus by controlling the transfer unit and controls the printing apparatus so that the photo (or image) and character message which are temporarily stored is printed on the surface of the recording medium in Step 229. In addition, the printed recording medium is discharged to the outside of the system in Step 230, and the routine is returned to the initial state.

Figure 4:
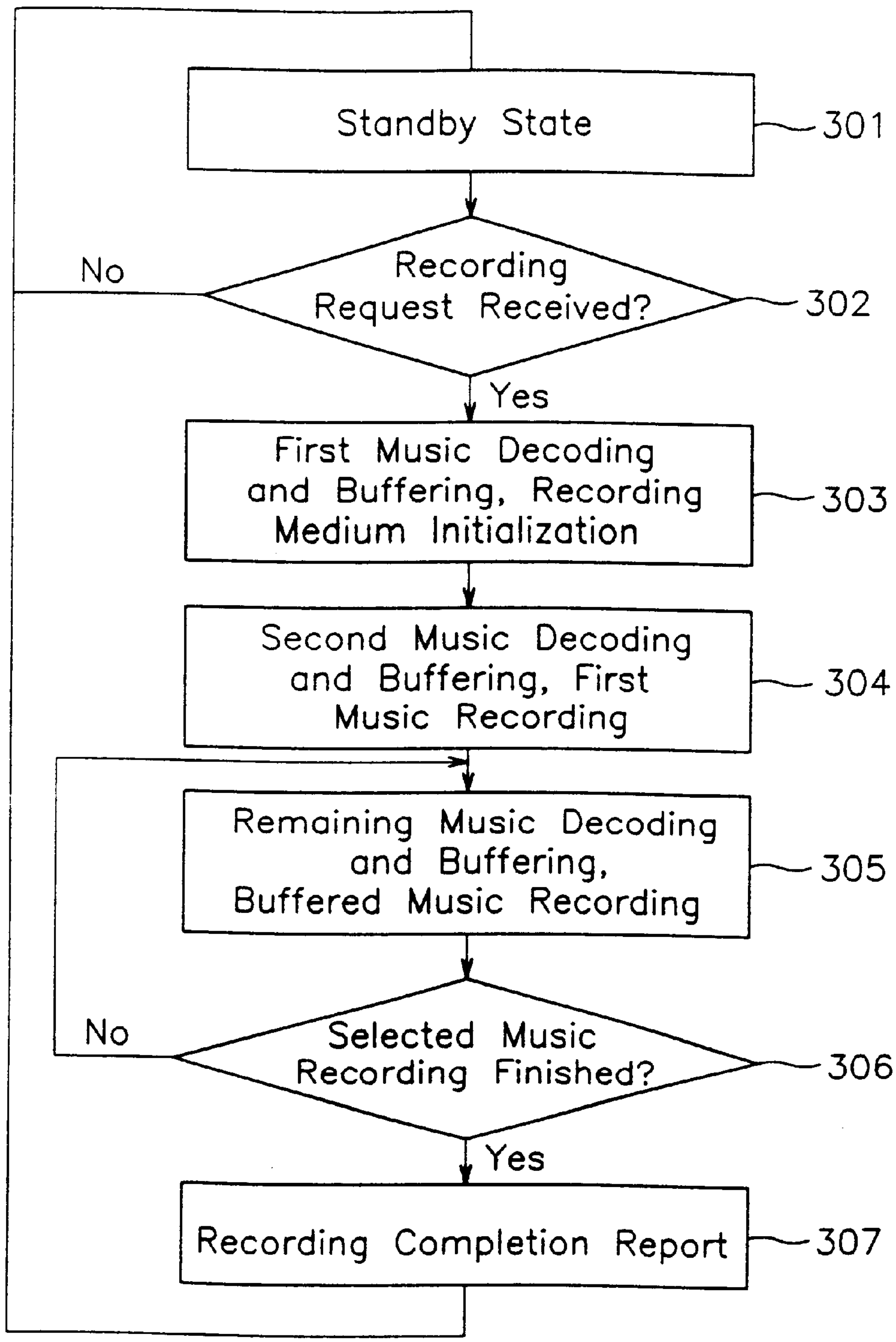
FIG. 4 is a flow chart of a music file recording process to a recording medium according to the present invention.

FIG. 4 is a flow chart for explaining an operation of the fabrication control apparatus according to the present invention.

In a standby mode in Step 301, when a procurement start signal is received from the main apparatus, the transfer unit moves the recording medium from the empty recording medium storing unit to the recording unit. In addition, as a certain music file is selected by a customer, when the main apparatus 15 requests a recording start or requests a recording start of the reserved music file in Step 302, the fabrication control apparatus 16 reads a requested music file from the database and stores the same onto the buffer. The buffered first music is decoded, and buffered. In addition, the buffered decoding data is converted onto a certain format proper to the selected recording medium and is recorded onto the initialized recording medium in Steps 303 and 304. In other words, the fabrication control apparatus 16 includes a data reading unit, a buffering unit, a decoding process unit and a recording process unit.

In addition, the data reading unit reads a music file indicated by the database, and the read music file is buffered onto the buffer. When the decoding process unit performs a decoding and buffering operations with respect to the buffered first music, the recording process unit initialize the recording medium. At the time when the decoding process unit decodes one music file and buffers the same, the recording processing unit records the buffered music file onto the recording medium. In other words, the data reading unit, the decoding process unit, and the recording process unit are independently operated but sequentially perform the data reading, decoding and recording operations.

When the recording operation of the music files selected by the customer is finished in Steps 305 and 306, the fabrication control apparatus 16 reports the recording operation to the main apparatus 15. When the recording completion received from the fabrication control apparatus 16, the main apparatus 15 controls the printing operation.

The above-described embodiment of the present invention has some features which are different from the conventional art to minimize the waiting time of the customer. Namely, in the conventional data vending machine system, when the customer selects a plurality of music files and then is requested to pay for the charge of the music files. When the payment is made, the music files which do not exist in the database of the system are downloaded from the central host computer, and then the recording medium is moved to the recording unit. Thereafter, the music files are recorded. In this case, the customer must wait long time to buy the music files. Therefore, it is very inconvenient.

In order to overcome the above-described problems of the conventional data vending machine, before the customer starts buying the music files, the music files selected by the customer are stored in the remote database. For implementing the above-described operation, in the present invention, a reserving function is provided. In the case that the customer does not make a reservation, the customer can buy only the music files which do not exist in the remote database. Therefore, in the present invention, when the customer starts buying the music files, the music files are transferred from the central host computer, so that it is possible to decrease time required for downloading the music files. In the embodiments of the present invention, the payments are made before selecting the music files through the main apparatus 15, and then the recording medium is selected, and the recordable recording medium is moved to the recording unit before the music selection is made. Therefore, in the present invention, only a certain number of the music files selected by the customer can be sold. Namely, the music files which are recorded onto one CD are not variable. For example, in the present invention, the number of music files is 5. In addition, upon selecting one music file through the main apparatus, the decoding and recording operations are performed. After the procurement confirmation key is inputted, it is impossible to cancel the selected music files. Therefore, in the present invention, after one music file is selected by a customer, the decoding and recording operation is performed by the fabrication control apparatus while the next music file is being selected. In addition, at the time when the music selection is completed by the customer, it is possible to record many music files. Thereafter, while the customer is taking his picture and inputting a character message, the music decoding and recording operation is almost finished. When the recording operation is finished, and the photo picturing and character message inputting operations are completed, the photo of the customer and the character message are printed on the surface of the recording medium. Namely, when buying one CD in the present invention, the customer actually needs only the time required for printing the photo and character message on the surface of the recording medium. In addition, after the recording operation is completed, when the customer does not finish the photo picturing and character message input, in the present invention, a certain default image and character message are printed.

In the database of the remote data vending machine according to the present invention, a limited number of music files, for example, 2000 music files, is stored. In order to effectively manage the stored music files, the list of the music files stored in the database of the remote data vending machine is managed by the central host computer. The file which will be deleted from the remote database is instructed thereby. If the database of the remote data vending machine is lost or damaged, the lost or damaged database of the remote data vending machine is recovered using the management database of a corresponding remote data vending machine stored in the central host computer. Different music files are stored in each data vending machine in accordance with the demands of the customer.

In the above-described embodiment of the present invention, the case that the listing and reserving apparatus was installed at the remote data vending machine was described. Preferably, another embodiment of the present invention may be adapted as follows.

A customer checks the list of the entire music files which are sold through a terminal connected with an internet network or a packet communication network. Namely, the screen for a listing and reserving operation is displayed on the terminal. The customer selects a music file and makes a reservation the same on the terminal. At this time, the central host computer asks the customer to input an inherent number of the data vending machine belong to the installation area of the data vending machine. At this time, the central host computer displays an inherent number and a region information of the data vending machine installed in a certain region. When the customer inputs an inherent number of the data vending machine in the region, the central host computer outputs a reservation number and requests the customer to input the password. When the customer inputs the password, the central host computer stores the reserved music files and the reservation number and the password and transfers the reservation information to the main apparatus of the data vending machine designated by the customer. The above-described operation is performed by the main apparatus of the data vending machine. Since the reservation number is provided by the central host computer, the reservation provided by the data vending machine is different.

As the listing and reserving apparatus, a known telephone network may be used. Namely, the customer may input an inherent number corresponding to each music file using a telephone network which is capable of transferring a voice guide message, and then the reservation number is outputted, and the password is inputted.

In the present invention, after the charge is paid, the music selection is performed. Preferably, the music file selection may be performed with respect to the music files stored in the remote data vending machine, and then the charge ay be paid in accordance with the number of the selected music files.

In addition, in the present invention, the music files are old. In another embodiment of the present invention, a digitalized video data may be sold using the data vending machine according to the present invention. The present invention is not limited to the selling of the music files. Any kinds of the digital data may be sold.

As described above, in the present invention, it is possible to buy a recording medium which is fabricated by a customer for a shortest time and effectively manage the database of the remote data vending machine having a limited storing capacity and recover a lost and damaged database using a back-up database. In addition, in the present invention, it is possible to fabricate a demand-on music album by printing a photo, image, or character message on a surface of the recording medium selected by the customer.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. In a data vending machine including a host computer and a plurality of remote data vending machine connected with the host computer via a communication network, said host computer, comprising:

- a first database for storing a plurality of digitalized data files;
- a management database for storing a management data including a list of data files stored therein by each data vending machine, a sold date of each data file, and a sold number of the same;
- a management data updating means for updating the management database in accordance with a management data transferred from the data vending machine;
- a deletion instruction message generation means for generating a message for instructing a deletion data file which will be deleted among the data files stored in the data vending machine with reference to the management data corresponding to the management database when a data file transfer request is received from the data vending machine; and
- a transferring means for transferring a data file requested from the data vending machine to the data vending machine together with a deletion message generated by the deletion instruction message generation means, each data vending machine, comprising:
  - a second database for storing a part of the data files stored in the first database of the host computer;
  - a listing and reserving means for providing a listing and selection function and a procurement reservation function of the lists of the data files stored in the first database stored in the host computer;
  - a fabrication means for reading a data file selected by a customer from the second database of the data vending machine and recording the read data file onto a recording medium;
  - a charge processing means for processing the charge for the cost of the data file; and
  - a main control means for controlling the entire operations of the system, said main control means, comprising:
    - a reservation information processing means for requesting a transfer of the data files which are not stored in the second database among the data files reserved by the listing and reserving means to the host computer;
    - a database managing means for deleting the deletion instructed data file from the second database when a deletion request data file is received from the transfer means of the host computer together with the deletion instruction message and storing the received data file onto the second database;
    - a procurement processing means for reading a data file selected by the customer from the second database and recording the read data file onto a recording medium by instructing to a fabrication means; and
    - a selling information transfer means for storing a selling information related to the procurement data file of the customer and transferring to the host computer.

2. The data vending machine of claim 1, wherein said procurement processing means of the main control means displays a data file included in a reservation information having a matched reservation number in the case of a procurement based on a reservation, instructs a recording start of the reserved data files when the charge payment is made by the charge processing means, and instructs a recording start of a selected data file upon checking that a data file is sold among the list of the data files stored in the second database when a charge payment is made by the charge processing means in the case of a direct music file selection.

3. The data vending machine of claim 1, wherein said procurement processing means of the main control means displays a charge corresponding to all selected data files when a selection is made by a customer and instructs a recording start to the fabrication means so that all data files selected by the customer are recorded onto the recording medium.

4. The data vending machine of claim 1, wherein said data vending machine includes:

a photo picturing means for picturing a photo of a customer in accordance with a control of the main control means;

an input means for inputting a character message in accordance with a control of the main control means; and a printing means for printing a photo (or an image selected among the stored images) of a customer pictured by the picturing means in accordance with a control of the main control means and a character message inputted by the customer on a surface of the recording medium.

5. The data vending machine of claim 4, wherein said data vending machine includes:

an empty recording medium means for storing a recordable empty recording medium; and a transfer means controlled by the procurement processing means for transferring the empty recording medium stored in the empty recording medium storing means to the fabrication means and transferring the recording medium recorded by the fabrication means to the printing means.

6. The data vending machine of claim 4, wherein said fabrication means includes:

a buffering means;

a data reading means for reading a data file instructed by the procurement processing means from the second database and temporarily storing onto the buffering means;

a decoding means for decoding a data file buffered by the data reading means;

a recording control means for converting the data file decoded by the decoding means onto a format proper to the selected recording medium; and more than one recording means for recording the converted data onto a recording medium in accordance with a control of the recording control means.

7. The data vending machine of claim 1, wherein said main control means includes an inventory information transferring means for storing an inventory of a consumption article consumed by each data vending machine, updating an inventory of the stored consumption article whenever the consumption article is consumed and periodically or non-periodically transferring to the host computer.

8. The data vending machine of claim 1, wherein said host computer includes a reservation information transferring means, and said listing and reserving means is connected with the host computer via a communication network and is installed at a portion different from that of the data vending machine wherein the list of the data files stored in the host computer is listed by the listing and receiving means, and when the data vending machine installed at a certain region is designated, the reservation information transfer means of the host computer transfers the reserved information to the designated data vending machine.

9. The data vending machine of claim 8, wherein said listing and reserving means includes one of a terminal installed at a customer side connected with the host computer via an internet network, a terminal installed at a customer side connected with the host computer via a packet communication network, and a telephone connected with a telephone switching network.

10. In a data vending method adapted to a system including a host computer for storing a plurality of data files and a plurality of remote vending machines connected with the host computer via a communication network, a data vending method, comprising:

a first step for selecting a list of data files among the lists of a plurality of data files stored in the host computer and reserving the selected data files;

a second step for receiving the data files which are not stored in the data vending machine among the reserved data files from the host computer and updating a database of the data vending machine using the received data files;

a third step for checking whether a reservation is made when a procurement is requested by a customer;

a fourth step for displaying the data files included in a reservation information having a reservation number identical to the stored reservation information on a screen and checking whether a charge payment is made when a reservation is made;

a fifth step for instructing the reserved data files to be recorded onto a recording medium when the charge payment is made and storing a sold information of the data files which will be recorded;

a sixth step for checking whether the charge payment is made in the case that a customer directly selects and buys a certain music file without making a reservation in the third step;

a seventh step for displaying the list of the data files stored in the database of the vending machine when the charge payment is made;

an eighth step for instructing the selected data files to be recorded onto a recordable recording medium when a certain data file is selected among the list of the displayed data files and storing an information of the selected and sold data files; and a ninth step for reading the record-instructed data files from the database and recording onto a selected recording medium.

11. The data vending method of claim 10, further comprising:

a tenth step for temporarily storing an image selected by a customer while the instructed data files are being stored onto the recording medium; and an eleventh step for printing the temporarily stored image on a surface of the recording medium when the recording operation is completed.

12. The data vending method of claim 11, further comprising a twelfth step for temporarily storing a character message inputted by the customer and printing the temporarily stored character message on a surface of the recording medium when the recording operation is completed.

13. The data vending method of claim 10, wherein said second step includes:

a thirteenth step for requesting a transfer of the data file which is not stored in the data vending machine among the reserved data files to the host computer;

a fourteenth step for transferring the deletion requested data file to the data vending machine together with the message which instructs a deletion of the data files among the data files stored in the data vending machine in the host computer; and a fifteenth step for deleting the deletion data file instructed by the host computer in the data vending machine from the database of the data vending machine and storing the requested data file onto the database.

14. The data vending method of claim 13, wherein said deletion instruction message includes a data file information which has the smallest sold number among the oldest sold date data files.

15. The data vending machine of claim 10, wherein said ninth step includes:

a sixteenth step for reading the record-instructed data file from the database and buffering the data;

a seventeenth step for decoding and buffering the buffered data file and initializing a recordable recording medium;

an eighteenth step for recording the buffered decoding data onto the recordable recording medium, reading the selected data file from the database and decoding and buffering the same; and a nineteenth step for reporting a recording completion when the recording operation of all selected data files is finished.

16. The data vending machine of claim 11, wherein said tenth step includes:

a twentieth step for checking whether a customer pictures his photo or selects one of the stored images while the selected data file is being recorded onto the recording medium;

a twenty fist step for picturing a photo of a customer when the customer wishes to take a picture and displaying the pictured photo on a screen;

a twenty second step for temporarily storing the photo selected by the customer among the displayed photos; and a twenty third step for displaying a plurality of images by the menu when the customer requests a selection of an image among the stored images in the twentieth step; and a twenty fourth step for temporarily storing an image file selected by the customer among the displayed images.

17. The data vending method of claim 12, wherein said character message input step includes:

a twenty fifth step for checking whether a character message is inputted using a keyboard or a character message is inputted using a touch screen;

a twenty sixth step for temporarily storing an inputted character message when the character message is inputted using the keyboard in the twenty fifth step; and a twenty seventh step for temporarily storing an inputted character message when the character message is inputted using the touch screen in the twenty fifth step.

* * * * *